(12) United States Patent
Koo et al.

(10) Patent No.: US 9,231,292 B2
(45) Date of Patent: Jan. 5, 2016

(54) MULTI-ANTENNA SIGNALING SCHEME FOR LOW-POWERED OR PASSIVE RADIO COMMUNICATIONS

(75) Inventors: Gregory Koo, Atlanta, GA (US);
Yenpao Lu, Cumming, GA (US);
Gregory D. Durgin, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 310 days.

(21) Appl. No.: 13/576,734

(22) PCT Filed: Feb. 1, 2011

(86) PCT No.: PCT/US2011/023381
§ 371 (c)(1),
(2), (4) Date: Aug. 2, 2012

(87) PCT Pub. No.: WO2011/094750
PCT Pub. Date: Aug. 4, 2011

(65) Prior Publication Data
US 2012/0299706 A1    Nov. 29, 2012

Related U.S. Application Data

(60) Provisional application No. 61/300,186, filed on Feb. 1, 2010.

(51) Int. Cl.
*H01Q 1/22* (2006.01)
*G06K 19/07* (2006.01)
(Continued)

(52) U.S. Cl.
CPC .......... *H01Q 1/2225* (2013.01); *G06K 19/0713* (2013.01); *G06K 19/07773* (2013.01); *H01Q 1/248* (2013.01); *H01Q 3/38* (2013.01); *Y02B 60/50* (2013.01)

(58) Field of Classification Search
CPC ............. H01Q 3/26; H01Q 3/38; H01Q 3/21; H01Q 3/22; G06K 9/0713; G06K 9/07773
USPC ................ 340/10.1, 572.7; 342/377; 343/853
See application file for complete search history.

(56) References Cited

U.S. PATENT DOCUMENTS

| 4,472,719 A | 9/1984 | Hills |
| 5,280,286 A * | 1/1994 | Williamson .................... 342/44 |

(Continued)

FOREIGN PATENT DOCUMENTS

WO    WO 2009133407 A1 *  11/2009  ............... H01Q 3/26

OTHER PUBLICATIONS

International Search Report and Written Opinion dated Apr. 25, 2011 for related PCT Patent Application No. PCT/US2011/023381.

*Primary Examiner* — Jennifer Mehmood
*Assistant Examiner* — Omar Casillashernandez
(74) *Attorney, Agent, or Firm* — Troutman Sanders LLP; Ryan A. Schneider; Mark Lehi Jones (57) ABSTRACT

A multi-antenna signaling scheme, system and method for passive or low-powered RF devices, such as a radio frequency identification tag, are herein described. In one embodiment, the presently disclosed subject matter discloses a Retrodirective Array Phase Modulator which is configured to allow RFID tags to return higher-powered signals with higher data rates back to an RFID interrogator or reader unit. In some configurations, pattern strobing is used which is an array-based transmission technique for stepping or sweeping an RF waveform through space so that passive radio devices may more efficiently harvest energy without increasing transmit power. In some configurations, the presently disclosed subject matter may also use a Staggered Pattern Charge Collector to boost the collection of microwave power.

20 Claims, 10 Drawing Sheets

(51) Int. Cl.
*H01Q 1/24* (2006.01)
*H01Q 3/38* (2006.01)
*G06K 19/077* (2006.01)

(56) References Cited

U.S. PATENT DOCUMENTS

| | | | |
|---|---|---|---|
| 6,509,836 B1 | 1/2003 | Ingram | |
| 6,559,798 B1* | 5/2003 | Marumoto et al. | 342/372 |
| 7,183,974 B1* | 2/2007 | Minkoff | 342/377 |
| 7,375,637 B2* | 5/2008 | Mickle et al. | 340/572.1 |
| 2001/0055948 A1* | 12/2001 | Ikeda et al. | 455/13.3 |
| 2007/0046369 A1* | 3/2007 | Schober et al. | 330/7 |
| 2007/0075911 A1* | 4/2007 | Yaginuma et al. | 343/853 |
| 2007/0285315 A1* | 12/2007 | Davis et al. | 342/377 |
| 2008/0100446 A1 | 5/2008 | Shintani | |
| 2008/0106418 A1* | 5/2008 | Sloan et al. | 340/572.7 |
| 2008/0197804 A1* | 8/2008 | Onishi et al. | 320/108 |
| 2009/0060015 A1* | 3/2009 | Beadle | 375/227 |
| 2009/0160611 A1* | 6/2009 | Calvarese et al. | 340/10.1 |
| 2010/0201312 A1* | 8/2010 | Kirby et al. | 320/108 |

* cited by examiner

PRIOR ART

MULTI-ANTENNA SIGNALING SCHEME FOR LOW-POWERED OR PASSIVE RADIO COMMUNICATIONS

CROSS REFERENCE TO RELATED APPLICATION

This application is a US National Stage of International Application No. PCT/US2011/023381, filed 1 Feb. 2011, which claims the benefit under 35 U.S.C. §119(e) of U.S. Provisional Patent Application No. 61/300,186, filed Feb. 1, 2010, both entitled "Multi-Antenna Signaling Scheme for Low-Powered or Passive Radio Communications", each of which is incorporated herein by reference as if set forth below.

STATEMENT REGARDING FEDERALLY SPONSORED RESEARCH

This invention was made with U.S. Government support under Agreement No. ECS-0546955, awarded by the National Science Foundation. The Government has certain rights in the invention.

TECHNICAL FIELD

The present system relates generally to radio frequency identification devices.

BACKGROUND

The field of radio frequency identification ("RFID") devices has shown that it is possible to exchange data with UHF or microwave devices, e.g. an RFID tag, that have little or no on-board power supply. RFID tags are often used to track inventory and to determine the location of objects. For example, a department store may place an RFID tag on a piece of clothing. An RFID interrogator may be placed at the entrance and/or exit of the department store. If the RFID tag indicates that the clothing has not been purchased, upon interrogation by the RFID interrogator, an alarm may sound when the article of clothing passes by the interrogator, thus helping to reduce theft.

There are two types of RFID tags: passive and active. An active RFID tag has an on-board power supply and transmits data stored on the tag to a receiving station. These types of tags are typically used when a local power supply is available and, because these tags are typically more expensive than passive RFID tags, when cost of each tag is not the primary factor. Passive RFID tags may or may not have an onboard power supply. The primary difference between the active and passive RFID tag is that the passive RFID tag employs backscatter signal modulation to reflect back a data signal when interrogated by an RFID interrogator, whereas the active RFID tag transmits according to preprogrammed schema and uses an RF transmission chain to create and send its data signal. The active RFID tag may also be configured to transmit a data signal when interrogated.

BRIEF SUMMARY OF THE DISCLOSURE

Briefly described, and according to one embodiment, aspects of the present disclosure generally disclose a multi-antenna signaling scheme, system and method for passive or low-powered RF devices that are configured to increase the distance in which data may be transmitted and received using multiple antennas at both the transmitter, receiver, and RF tag. In one embodiment, the presently disclosed subject matter discloses a Retrodirective Array Phase Modulator ("RAPM") which is configured to allow RF tags to return higher-powered signals with higher data rates back to an RFID interrogator or reader unit.

In some configurations, the presently disclosed subject matter also uses pattern strobing which is an array-based transmission technique for stepping or sweeping an RF waveform through space so that passive radio devices may more efficiently harvest energy without increasing transmit power (and violating spectrum regulations) or sacrificing broadcast coverage. Further, in some configurations, the presently disclosed subject matter may also use, alone or in combination with the RAPM or pattern strobing technique, a Staggered Pattern Charge Collector (SPCC). The SPCC is a circuit that is configured to boost the collection of microwave power by an energy-harvesting RF tag using multiple antennas.

In one exemplary and non-limiting embodiment, a radio frequency identification tag is disclosed. The RFID tag has a retrodirective array phase modulator configured for quadrature phase shift keying. The retrodirective array phase modulator has a retrodirective antenna array with at least one antenna pair and at least one microcontroller for controlling a plurality of switches that change a phase length of a transmission line between the at least one antenna pair. The RFID tag of the present example further comprises a memory for storing data. In some examples, the antenna array may be configured to be spatially strobed by sweeping, rotating or stepping the main pattern lobe. In some examples, the RFID tag may also use a charge collector for harvesting energy from an incident electromagnetic wave.

When used alone or in various combinations, these techniques and accompanying systems work together to preferably increase transmission range between an RFID tag and a reader unit. Further, because in some configurations the collection of energy at the RFID tag is increased, the amount of data transmitted or the rate of data transmitted may be increased.

The foregoing summarizes only a few aspects of the presently disclosed subject matter and is not intended to be reflective of the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter. Any headings provided herein are for convenience only and do not necessarily affect the scope or meaning of the claimed presently disclosed subject matter. Wherever possible, the same reference numbers are used throughout the drawings to refer to the same or like elements of an embodiment, and wherein:

DETAILED DESCRIPTION

The subject matter of the various embodiments is described with specificity to meet statutory requirements. However, the description itself is not intended to limit the scope of this patent. Rather, it has been contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly required. It should be understood that the explanations illustrating data or signal flows are only exemplary. The following description is illustrative and non-limiting to any one aspect.

It should also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. Also, in describing preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, other exemplary embodiments include from the one particular value and/or to the other particular value. The terms "comprising" or "containing" or "including" mean that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified. To facilitate an understanding of the principles and features of the presently disclosed subject matter, embodiments are explained hereinafter with reference to implementation in an illustrative embodiment.

Additionally, although the presently disclosed subject matter is described below using the 5.8 GHz unlicensed ISM microwave band, it should be noted that this is merely for purposes of describing the disclosed subject matter and not an explicit or implicit intention to limit the scope of the presently disclosed subject matter to that frequency.

Backscatter communication is a relatively low-powered method for exchanging radio information. Backscatter communication's most common use today is in the field of radio frequency identification where a transceiver unit (i.e. reader) retrieves identification information from an RF tag that backscatters a waveform as it adds modulated data. This technique requires little power at the RF tag, enabling the ability to run the tag electronics from energy scavenged from the impinging RF waveform.

A passive RF tag system consists of an RF tag and an RF reader or interrogator. A common RF tag contains 3 basic components: an antenna, a modulating circuit, and a memory. These components work together to form a passive device that is capable of modulating information on backscattered radio waves. The RF reader contains a transmitter and a receiver, e.g. a transceiver.

Figure 1:
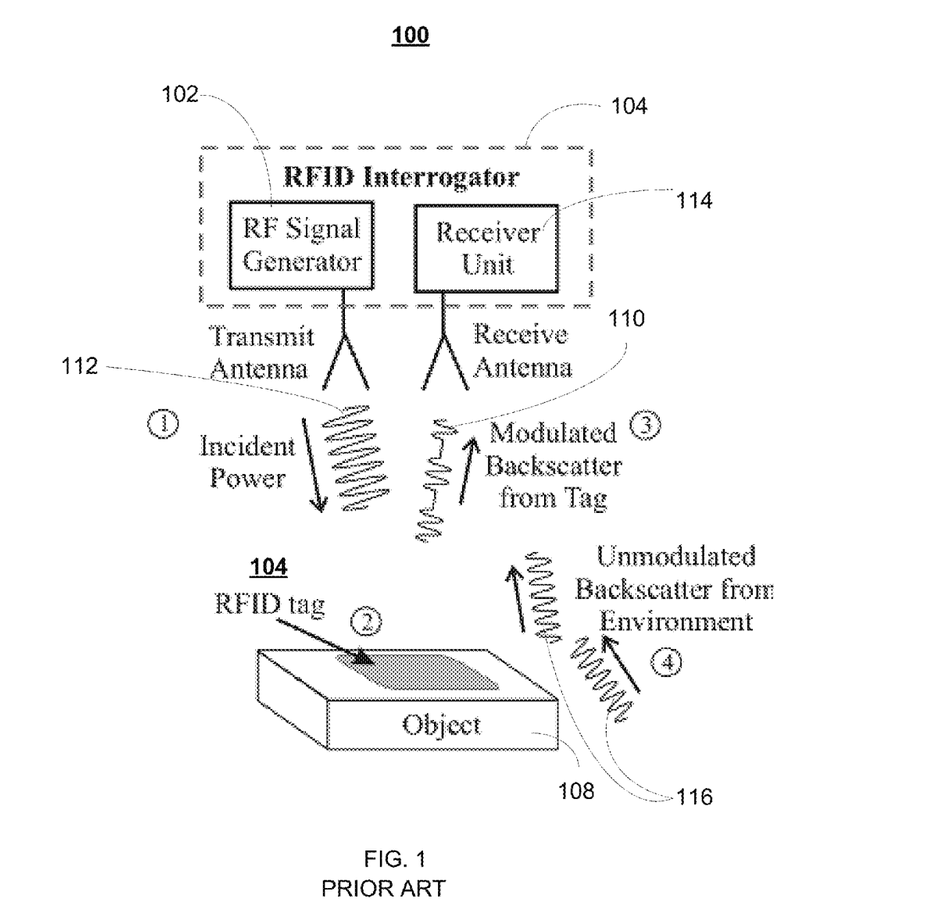
FIG. 1 illustrates an exemplary radio frequency tag system.

The operation of an RFID or RF tag system 100 as is known in the present art is illustrated in FIG. 1. The RF Signal Generator 102, which is a transmitter unit, in the interrogator 104 radiates a continuous wave signal 112 towards RF tag 106, which is attached to object 108. The tag 104 then re-radiates the signal with modulation that contains the object's 108 identification or telemetry data. This modulated backscatter 110 is received by the receiver unit 114, the RFID reader, along with many unmodulated multipath waves 116 scattered from the nearby environment, i.e. emissions that bounce off of objects around tag 104 rather than emissions that are transmitted by tag 104. The receiver unit 114 will process the total signal, backscatter 110 and multipath waves 116, and extract the desired information.

Figure 2:
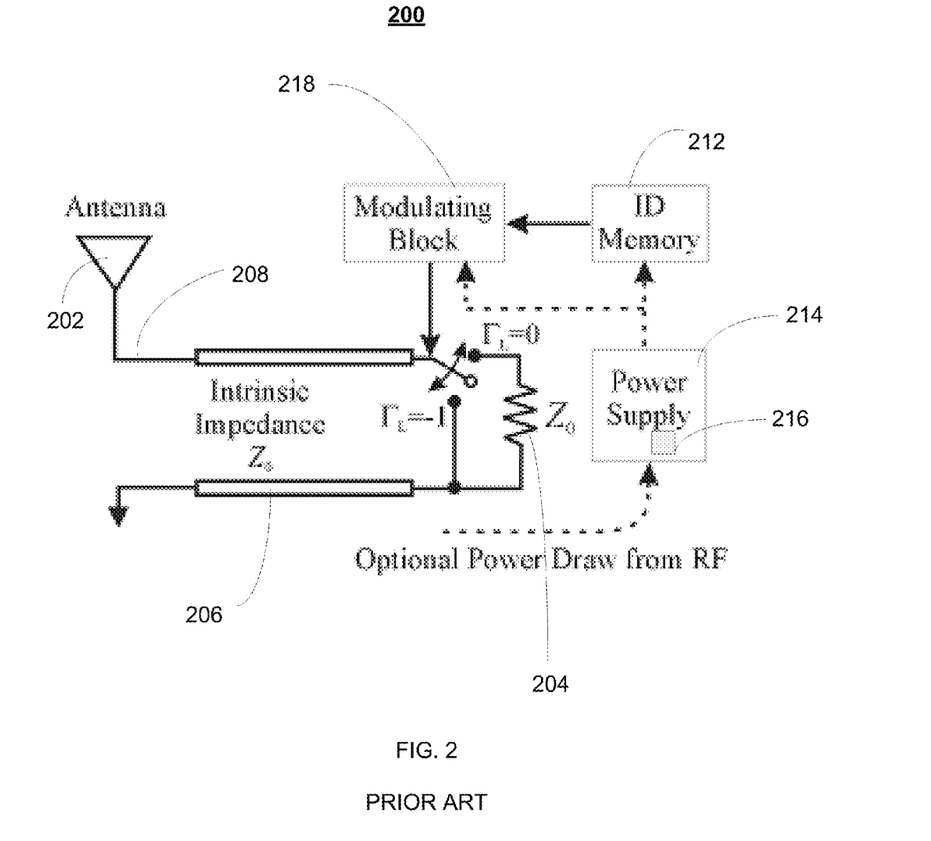
FIG. 2 is an exemplary schematic for a radio frequency tag which modulates information on a backscattered waveform according to an aspect of the presently disclosed subject matter.

The inner circuitry of a conventional RF tag, such as RFID 104 of FIG. 1, is relatively simple and is illustrated in FIG. 2. The RFID tag circuit 200 has an antenna 202 that is connected to either a matched load 204 or an electrical short load 206 by a transmission line 208. When the matched load 204 is connected, all power received by the antenna 202 is transmitted into load 204 without reflection; in other words, the received power is substantially or completely absorbed by RFID tag circuit 200. When the short load 206 is connected, the transmission line 208, in theory, may experience perfect reflection; received power is completely reflected, reradiated and emitted through the antenna 202.

By switching between different loads, it is possible to modulate data onto the backscattered radio waves. For the case of RFID, the RFID tag circuit 200 is preferably configured to modulate a unique sequence of 1s and 0s—the object identification code—onto the backscattered waves. Thus, the modulation controlled by modulation block 218 may be driven by a non-volatile memory 212 requiring a relatively small DC power supply 214 that is taken from an on-board charge pump 216, which uses an array of capacitors to rectify and step-up the voltage of an incident RF wave.

To increase the probability that the reradiated signal from antenna 202 reaches a base station or interrogator, it may be preferable to have the reradiated energy be transmitted in the direction from which the incident RF wave came. This helps to reduce the power requirements for transmission and can increase the likelihood that a base station receives the signal. In some configurations, a retrodirective array (RA) may be used to retransmit a signal. An RA is a device or setup that provides for the ability to reradiate an incident or impinging waveform back in the general direction that the waveform arrived. This trait helps improve non-line-of-sight communication and reduces necessary array hardware required for active beam-steering. For example, a beneficial use of the passive beamforming capability of an RA may be in backscatter sensors. Due to the weak signal power that is common in a backscatter communication link, the higher gain of an array in conjunction with passive beam-steering typically may yield greater operational distances for such sensors.

Figure 3:
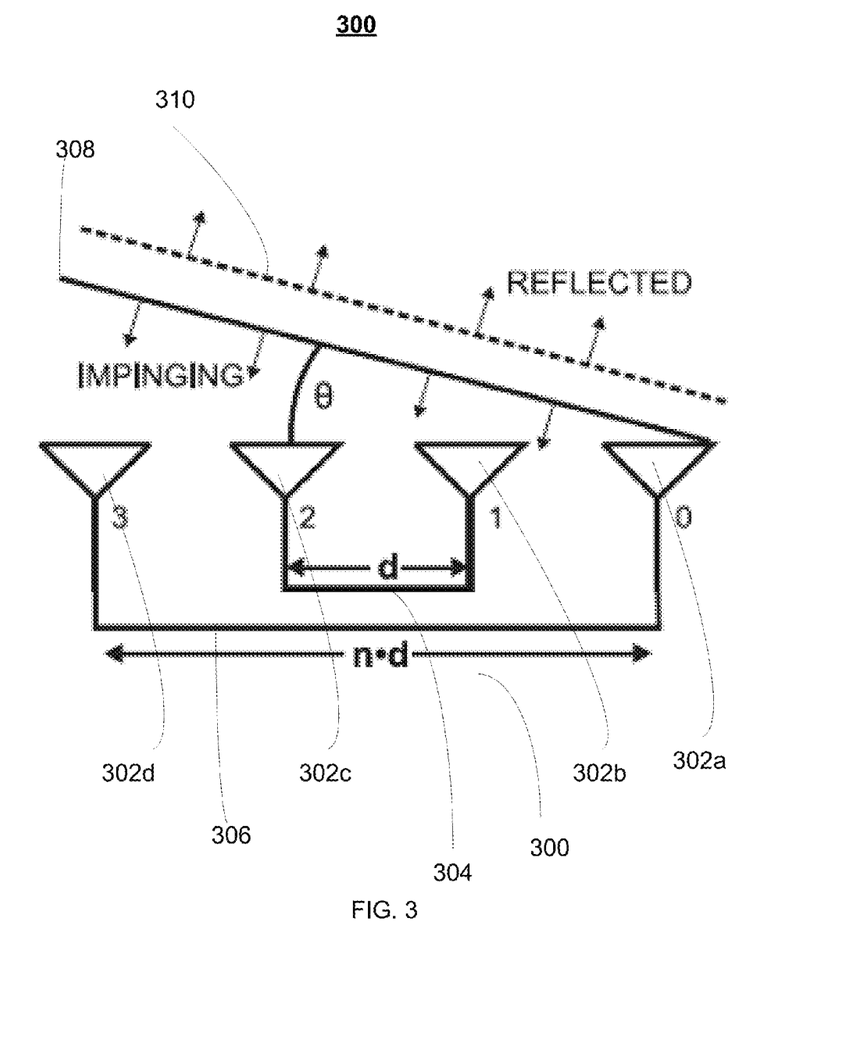
FIG. 3 illustrates an exemplary four-element retrodirective array according to an aspect of the presently disclosed subject matter.

FIG. 3 is an illustration showing the operation of a retrodirective array. FIG. 3 has a four element RA 300 constructed with four identical antennas, 302*a-d*. Beginning with the inner antenna pair, 302*b* and 302*c*, an arbitrary length transmission line, "d", 304 is connected between antennae 302*b* and 302*c*. Further, a second transmission line of length, "(n*lambda)+d", 306 is connected between antennae 302*a* and 302*d*. Additional antenna pairs thereafter are then connected by a transmission line of equal or integer multiple lengths of the full electrical wavelength at the frequency of interest, lambda, plus the length "d" of the innermost antenna pair. This constraint arises from a need to maintain the relative phase offset that occurs between the antenna pairs when an oblique wavefront impinges on the array. Without substantially identical line lengths, assuming any line with additional phase length of 360 degrees or any integer multiple of 360 degrees is deemed identical, interference may occur when the wave is reradiated and retrodirectivity no longer holds.

In FIG. 3 as the wavefront of wave 308 sweeps over array 300, each antenna element 302*a-d* incurs an additional phase delay with respect to the delay of antenna 302*a*. The wavefront of wave 308 then propagates down each interconnecting line and is reradiated by the antennas 302*a-d* on the opposing side. After the wavefront of wave 308 crosses the middle of the array 300, the same event occurs. In the case of FIG. 3, wave 308 is absorbed by antennas 302*a* and 302*b* and reradiated by antennas 302*c* and 302*d*, respectively.

Antennas 302*c* and 302*d* then absorb the wavefront of wave 308 at a later point in time while antennas 302*a* and 302*b* reradiate the wave 308. After this complete cycle, the uniform wavefront of wave 308 propagates back toward the direction of arrival. For this retrodirectivity to occur, each antenna pair, 302*b,c* and 302*a,d*, maintains a relative phase difference that is created due to the angle of incidence of wave 308 and the spatial separation of the antennas 302*a-d*. It is these phase offsets that serve to steer wave 308 back toward the direction of arrival. This mechanism of beam-steering that occurs during the re-radiation process can be paralleled to that of conventional beam-steering with phase shifters.

Figure 4:
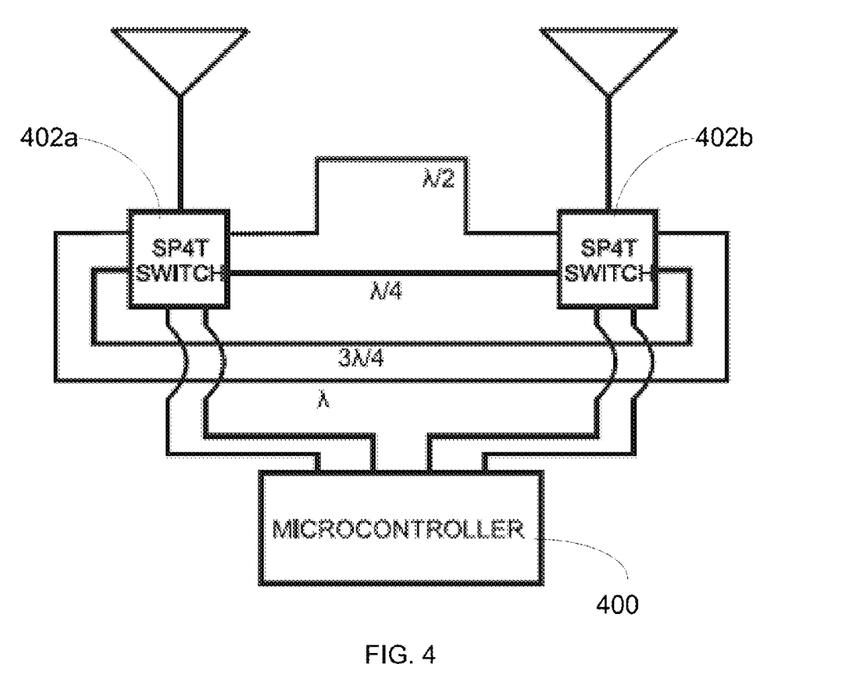
FIG. 4 illustrates an exemplary two element retrodirective array phase modulator according to an aspect of the presently disclosed subject matter.

It is also possible to alter the phase of an incoming wavefront by implementing switches to allow different predetermined line lengths to be interchanged between the two antennas in a pair. By switching the line lengths of the antenna pairs simultaneously, one can then achieve phase shift keying of the reradiated wave. FIG. 4 is an illustration that shows the phase modulation block for an antenna pair, such as antennae 302*b* and 302*c*, in an RA. Each additional antenna pair would consist of the same block. A retrodirective array phase modulator, an example of which is shown in FIG. 4, can be configured to perform quadrature phase shift keying. By using microcontroller 400, two switches, 402*a* and 402*b*, can be controlled simultaneously to switch between lines lengths of: $\lambda/4$, $\lambda/2$, $3\lambda/4$, and $\lambda$, where $\lambda$ is wavelength of radiation. Electrical line lengths $\lambda/4$, $\lambda/2$, $3\lambda/4$, and $\lambda$ induce phase shifts in the reradiated signal of 90°, 180°, 270°, and 360°, respectively. The general signaling matrix for a lossless RAPM can be shown by way of example in Equation 1:

$$\bar{S}(t) = \begin{vmatrix} 0 & P & 0 & 0 & \cdots \\ P & 0 & 0 & 0 & \\ 0 & 0 & 0 & P & \\ 0 & 0 & P & 0 & \\ \vdots & & & & \ddots \end{vmatrix}, \text{ where } P = e^{-j\frac{2\pi}{\lambda}l(t)}.$$

Equation 1

For an exemplary QPSK scenario, l(t) can be lengths of $L+\lambda/4$, $L+\lambda/2$, $L+3\lambda/4$, and $L+\lambda$, resulting in a signaling matrix with 90° phase rotations between the four different states. An advantage that a RAPM has, according to an aspect of the presently disclosed subject matter, over conventional backscatter communication hardware is that more incident signal energy is backscattered due to additional array gain, retrodirectivity, and phase modulation. With conventional modulation techniques, one or more antennas are switched between resistive or reactive loads to modulate the magnitude or phase of a backscattered signal. Although conventional techniques can achieve equivalent peak gains to that of RAPMs, they typically do not achieve the beamwidth of an RAPM without the use of array processing hardware. For the passive or low-powered backscatter sensors, the power requirements for such array processing hardware may be unfeasible.

Figure 5:
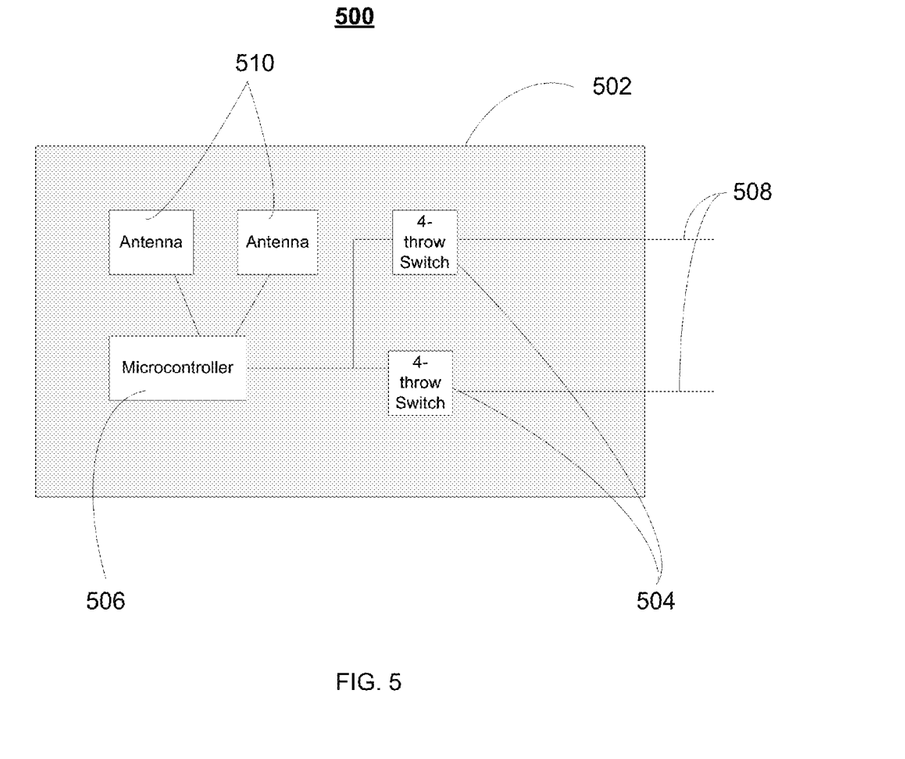
FIG. 5 illustrates a 2-antenna element, quadrature phase shift keying ("QPSK")-modulator RAPM board according to an aspect of the presently disclosed subject matter.

FIG. 5 is an illustration of an exemplary and non-limiting QPSK RAPM circuit 500. For example, and not by way of limitation, QPSK RAPM circuit 500 may be fabricated on 7 mil FR4 circuit card 502 using two 4-throw switches 504, antenna array 510 and a low-powered Texas Instruments microcontroller 506. Microcontroller 506 may have a memory having instructions stored thereon for control of 4-throw switches 504. It should be noted that instructions stored on or used by one or more components of the presently disclosed subject matter may be stored in a computer readable storage medium. By way of example, and not limitation, computer readable storage media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the an onboard computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 6:
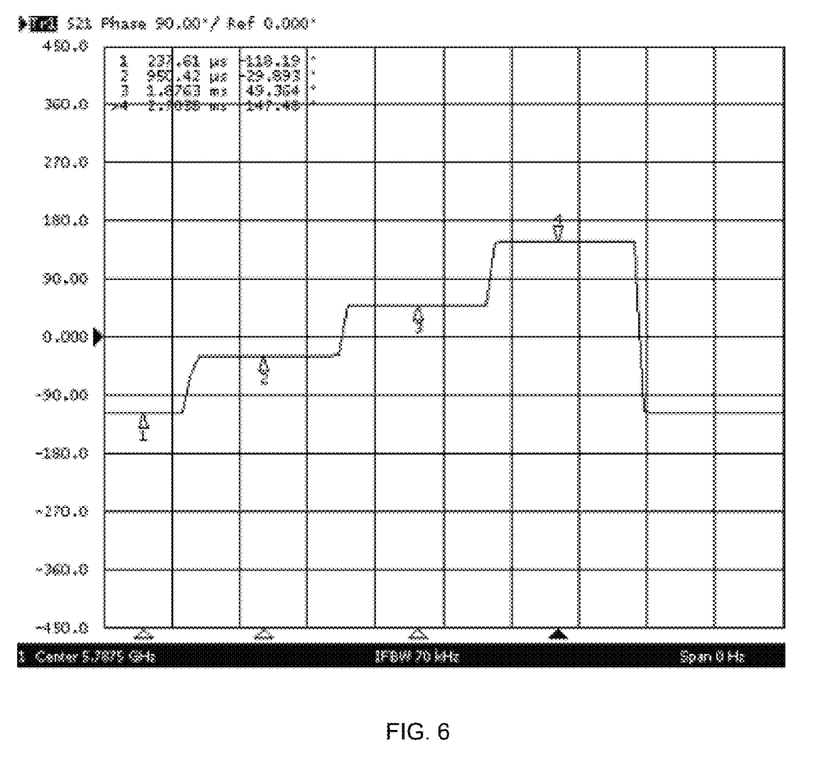
FIG. 6 is a graphical illustration of phase versus time for a slowly-modulated, 2-antenna element QPSK RAPM board according to an aspect of the presently disclosed subject matter.

The phase shifting capabilities of a RAPM according to an aspect of the presently disclosed subject matter were tested using testing communication lines 508 for a 1 kHz switching rate using an Agilent E5071B network analyzer. The relative phase differences between the four states of the RAPM were found to be: 88.3°, 79.2°, 98.2°, and 94.3°, as shown in FIG. 6.

In some configurations, the RAPM of the presently disclosed subject matter may increase the power of the backscattered information link and/or may reduce to the power required by electronics to perform a data exchange. By using higher-order m-ary PSK modulation, the integrated circuitry on the RF tag can spend less time transmitting a data packet. Since the time that modulation circuitry is "on" instead of "asleep" is one of the largest sources of power drain for an RF tag, reducing the time required to transmit a digital data packet will reduce the power requirements of the device by a similar factor.

The amount of power into a passive, energy-harvesting UHF/microwave RF tag may be increased using spatial strobing of transmitted UHF/microwave power. In some configurations, this can be accomplished without increasing overall transmission power from a base station or regulatory restrictions on transmission. Problematically, antenna gain in one direction comes at the expense of gain in another direction. In an exemplary embodiment of the presently disclosed subject matter, the microwave excitation of passive devices may be strobed through space by either sweeping (swept) or stepping the antennas, such as antennae 510 of FIG. 5, main pattern lobes.

At first, this may seem like a zero-sum exercise: increasing the gain by a factor of A would require increased sweeping to maintain complete coverage, reducing the duty cycle of excitation by an equivalent factor of A. The nonlinear charge pump circuitry operates more efficiently under higher excitation levels with increased duty cycles than under continuous excitation of the same average power level.

Figure 7:
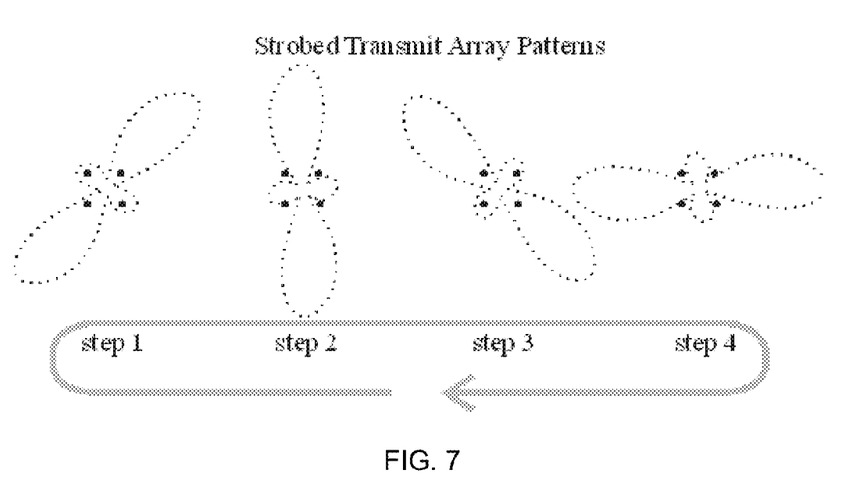
FIG. 7 is an example of a 4-step strobed pattern for an antenna array according to an aspect of the presently disclosed subject matter.

While the pattern may be either swept or stepped, the hardware involved in selecting several discrete configurations of an array's feed networks is relatively simpler than a fully-steerable array. Furthermore, the series of stepped, discrete antenna patterns need not be a well-defined single beam shape; rather, the patterns must simply have complete coverage in the desired region, such as the example in FIG. 7. As shown in FIG. 7, a two-lobed energy transmission or reception pattern may be rotated, shown as Steps 1-4. The two-lobed pattern in FIG. 7 can be generated from transmitter array elements that are farther apart than a typical λ/2-spaced array and, advantageously, less prone to near-field "hot-spots" that violate the FCC's safety requirements for maximum microwave field strength from an intentional radiator.

The ability to add antenna gain to a transmitter gain is particularly valuable for microwave readers in the 5.8 GHz band. Unlike other ISM radio spectrum, there is no FCC requirement to reduce power into a fixed transmit antenna array if the gain is increased past 6 dBi, corresponding to the 6 dBW of maximum equivalent isotropically radiated power ("EIRP") allowed with the 1 Watt maximum power input into a transmit antenna.

Figure 8A:
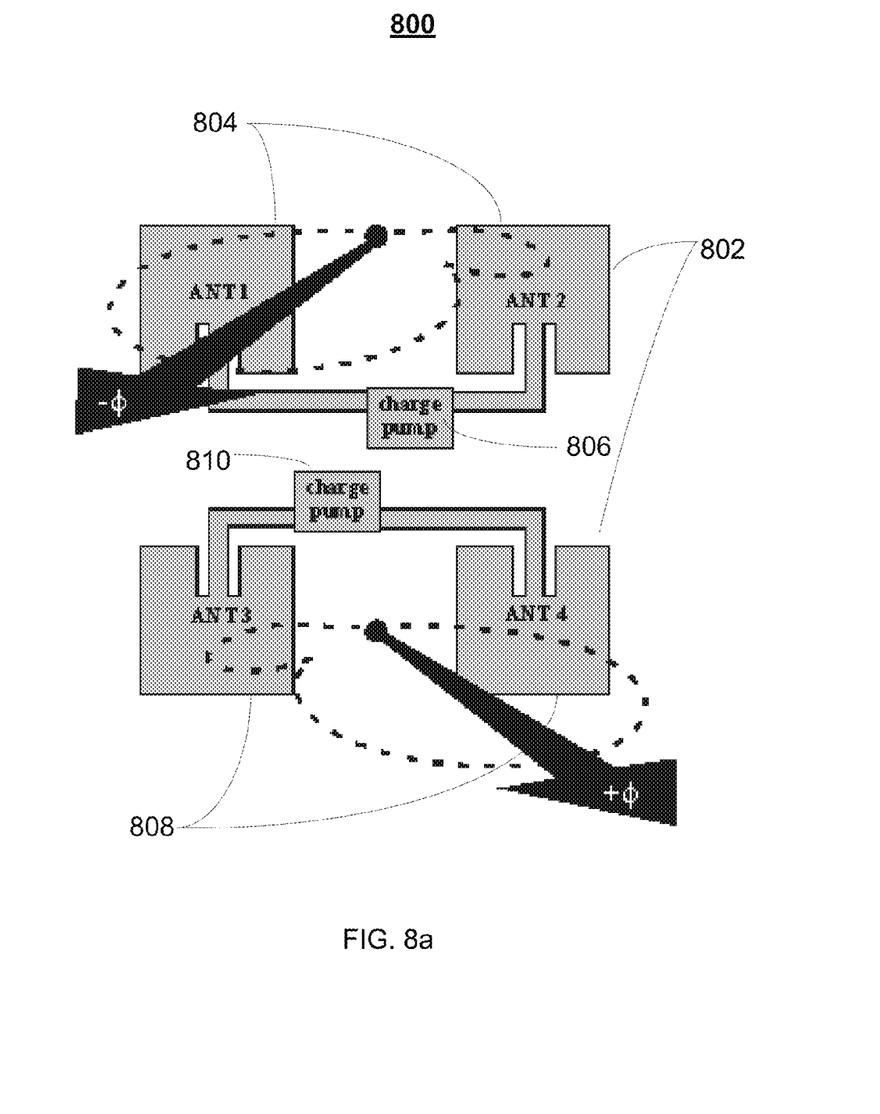
FIG. 8a is an exemplary 2×2 staggered-pattern charge collector with patch antenna elements according to an aspect of the presently disclosed subject matter.

It may be useful or necessary to provide for an increased power supply available to a passive, energy-harvesting RF tag. In an exemplary embodiment, a staggered pattern charge collector ("SPCC") may be used. FIG. 8a is an illustration of an exemplary SPCC. SPCC 800 has a 2×2 array of patch antennas 802. The top pair 804 of patch antennas 802 is electrically connected to charge pump 806 with phases that point the total peak radiation pattern toward the −Φ azimuth direction. The bottom pair of patch antennas 808 is electrically connected to charge pump 810 with phases that point the total peak radiation pattern toward the +Φ☐ azimuth direction. In the present configuration, each sub-array pair of patch antennas, 804 and 808, could experience approximately +3 dB of gain in their peak directions when compared to a regular patch antenna. Collectively, the two sub-arrays 804 and 808 can still cover the full half-space of a single patch antenna, providing nearly +5 dB gain in substantially all directions.

For microwave frequencies, an array of patch antennas could be made small enough so that a separate antenna or set of antennas could be used for backscatter signaling. This segregation of space can help to simplify the RF tag design process. Conversely, a set of low-powered field effect transistor ("FET") switches can disengage the SPCC charge pumps after sufficient or predetermined amount of charge has been collected, and engage backscatter signaling circuitry (such as the RAPM network) for the duration of data transmission. Or, in another configuration, a single SPCC charge pump can engage a set of low-powered FET switches that change the feed points of the other sub-array charge pumps, aligning their corresponding antenna patterns towards the direction that provided the fastest, or a predetermined time, charge-to-threshold.

Figure 8B:
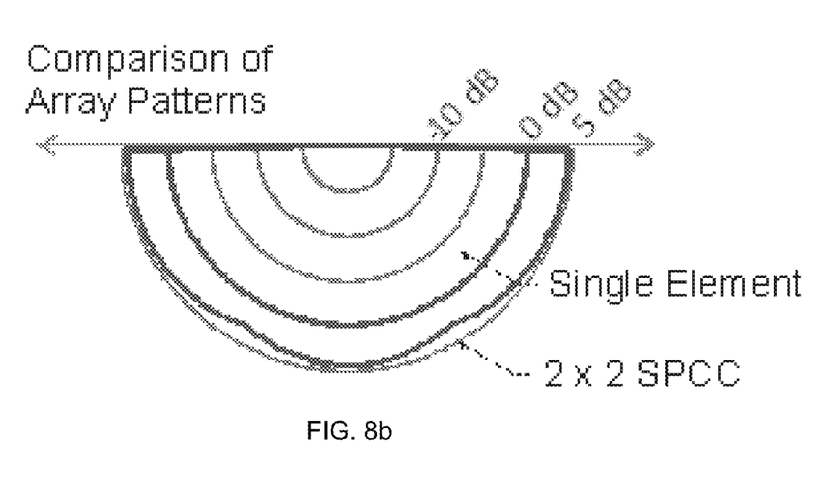
FIG. 8b is an illustration showing a comparison of total gain patterns for a single antenna element in the half space and the 2×2 staggered-pattern charge collector of FIG. 8a according to an aspect of the presently disclosed subject matter.

FIG. 8b is an illustration showing the difference in how a basic 2×2 SPCC, such as 2×2 SPCC 802 of FIG. 8a, array performs when compared to an array of 4 individual patch antenna elements connected to separate charge pumps. If threshold voltage of charge pump diodes is the primary concern for powering a device, then the SPCC delivers two big gains. First, there is an average +3 dB gain in antenna pattern that doubles the power into one of the SPCC charge pumps, increasing the likelihood that it will actually turn-on. Second, the two SPCC antennas will have an effective radiation impedance of half a single patch antenna. This drop in impedance means that, with twice the received power, the amplitude of the microwave voltage into the charge pump may be doubled, resulting in an increase in the ability to turn on the power-harvesting circuitry as well as a boost in the conversion efficiency. FIG. 8b illustrates the gains of the 2×2 SPCC by graphing the peak voltage output of one SPCC sub-array (the one pointing in the RF direction of arrival) and the peak voltage output of a single patch antenna.

Figure 9:
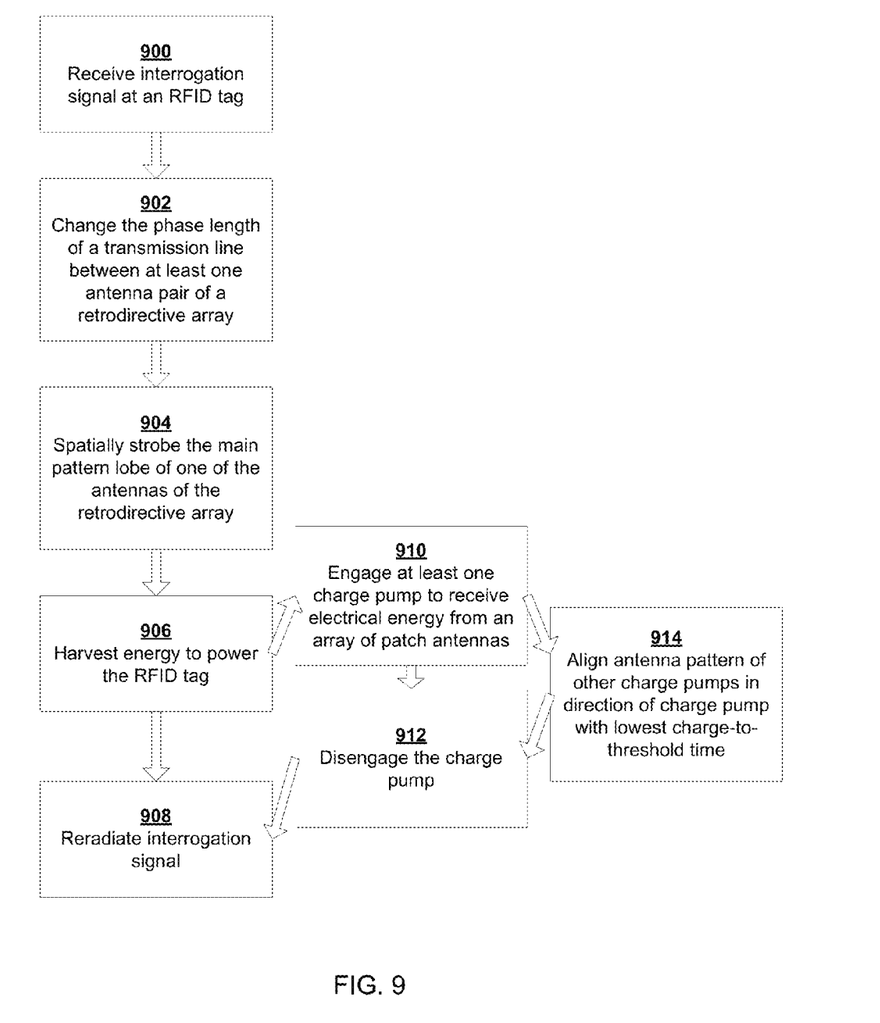
FIG. 9 is an exemplary method for multi-antenna signaling.

FIG. 9 is an exemplary method for multi-antenna signaling that may be used in conjunction with an RFID tag or other device. It should be noted that the method of FIG. 9 and the presently disclosed subject matter, above, are not limited to an RFID tag. A device using the presently disclosed subject matter, such as an RFID tag, receives 900 an interrogation signal. The interrogation signal is typically in the form of a transmitted electromagnetic wave, i.e. the device is not hardwired to the base station or transceiver transmitting the interrogation signal, though this is not always the case. In some examples, it may be preferable to use a retroactive array phase modulator configured for quadrature phase shift, as described above. Thus, the phase length of various transmission lines may be changed 902 between at least one antenna pair of the retrodirective array.

To better receive a signal, the main pattern lobes of one of the antennas of the retrodirective array may be spatially strobed 904. For example, the lobe may be strobed in a sweeping or rotating pattern. To power the device, the energy of the incident electromagnetic wave, or energy from another wave, may be harvested 906. After the energy is harvested, the device may be configured to reradiate the interrogation signal as a modulated interrogation signal carrying data stored on a memory on the device.

To increase the amount of energy harvested at step 906, the device may have one or more charge pumps engaged 910 with an array of patch antennas. The electromagnetic energy induces a charge on the charge pumps, which in turn charge a capacitor bank, providing energy to the device. Once the charging cycle is complete, the charge pumps may be disengaged 912. To further increase the probability of charging or to reduce the charge-to-threshold time (i.e. the time required to reach a potential), the antenna patterns of the charge pumps may be aligned 914 in the direction of the charge pump with the lowest charge-to-threshold time.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. Therefore, the present disclosure should not be limited to any single aspect, but rather construed in breadth and scope in accordance with the appended claims.

What is claimed is:

1. A radio frequency identification tag, comprising:
   a retrodirective array phase modulator configured for quadrature phase shift keying comprising:
   a retrodirective antenna array comprising at least one antenna pair; and a staggered pattern charge collector for harvesting energy from an incident electromagnetic wave, comprising:
   an array of patch antennas; and
   a plurality of charge pumps in electrical communication with each of the array of patch antennas, wherein the plurality of charge pumps are configured to collect a charge;
   at least one switch configured to selectively engage and disengage the retrodirective array phase modulator, wherein the at least one switch is configured to disengage at least one of the plurality of charge pumps after the at least one of the plurality of charge pumps has collected a predetermined amount of charge, the at least one switch is further configured to engage the retrodirective array phase modulator after the at least one switch disengage at least one of the plurality of charge pumps; and
   a memory for storing data.

2. The radio frequency identification tag of claim 1, wherein the quadrature phase shift keying is higher-order M-ary phase shift keying modulation configured to reduce a transmission time of data.

3. The radio frequency identification tag of claim 1, wherein a main pattern lobe is spatially strobed.

4. The radio frequency identification tag of claim 3, wherein the antenna array of the retrodirective array phase modulator is spatially strobed by sweeping, rotating or stepping the main pattern lobe.

5. The radio frequency identification tag of claim 1, further comprising a plurality of 4 throw switches configured to change a phase length of a transmission line between the at least one antenna pair.

6. The radio frequency identification tag of claim 1, further comprising at least one microcontroller for controlling a plurality of switches that change a phase length of a transmission line between the at least one antenna pair.

7. The radio frequency identification tag of claim 1, wherein the array of patch antennas are configured so that a total peak radiation pattern of each of the array of patch antennas point in different directions.

8. The radio frequency identification tag of claim 1, wherein at least one of the plurality of charge pumps is configured to engage one or more switches to change a feed point of the remaining plurality of charge pumps to align at least one antenna pattern of at least one charge pump of the remaining plurality of charge pumps towards a direction that provided a predetermined charge-to-threshold time.

9. The radio frequency identification tag of claim 1, wherein the plurality of charge pumps are configured to be nonlinear to increase the efficiency of the plurality of charge pumps under higher excitation levels with increased duty cycles.

10. The radio frequency identification tag of claim 9, further comprising at least one low power field effect transistor switch.

11. The radio frequency identification tag of claim 1, further comprising a data switch configured to switch from a matched load to eliminate reradiation of at least a portion of the energy of an incident wave to an electrical short load to reradiate at least a portion of the energy of the incident wave.

12. The radio frequency identification tag of claim 11, wherein the data switch is controlled by the retrodirective array phase modulator.

13. A method for multi-antenna signaling, comprising:
   receiving, at a radio frequency identification tag, an incident electromagnetic wave comprising an interrogation signal;
   changing a phase length of a transmission line between at least one antenna pair of a retrodirective array at the radio frequency identification tag;
   spatially strobing a main pattern lobe of at least one antenna of the at least one antenna pair of the retrodirective array;
   selectively engaging and disengaging, with at least one switch, the retrodirective array;
   when the at least one switch is engaged, harvesting energy from the incident electromagnetic wave by a plurality of charge pumps;
   disengaging, by the at least one switch, the least one charge pump of the plurality of charge pumps when a certain charge is harvested; and
   engaging a retrodirective array phase modulator after the disengaging of the at least one charge pump of the plurality of charge pumps.

14. The method of claim 13, further comprising modulating and reradiating the interrogation signal.

15. The method of claim 13, further comprising aligning at least one antenna pattern of at least one patch antenna in a direction of at least one charge pump of the plurality of charge pumps having the lowest charge-to-threshold time.

16. A multi-channel signaling system, comprising:
- a radio frequency identification tag comprising a retrodirective array phase modulator configured for quadrature phase shift keying, comprising:
  - a retrodirective antenna array comprising at least one antenna pair, wherein the antenna array of the retrodirective array phase modulator is spatially strobed by sweeping, rotating or stepping the main pattern lobe; and
  - at least one microcontroller for controlling a plurality of switches that change a phase length of a transmission line between the at least one antenna pair;
- a staggered pattern charge collector for harvesting energy from an incident electromagnetic wave, wherein the staggered pattern charge collector comprises:
  - a plurality of arrays comprising a plurality of patch antennas; and
  - a plurality of charge pumps, wherein at least one of the plurality of charge pumps are in electrical communication with at least one of the plurality of arrays, wherein the plurality of charge pumps are configured to collect a charge;
- a memory for storing data; and
- a data switch configured to switch between a matched load that substantially eliminates the reradiation of at least a portion of the energy of the incident electromagnetic wave to an electrical short load that causes the reradiation of at least a portion of the energy of the incident electromagnetic wave.

17. The system of claim 16, wherein the array of patch antennas are configured so that a total peak radiation pattern of each of the array of patch antennas point in different directions.

18. The system of claim 16, further comprising a plurality of switches to disengage at least one of the plurality of charge pumps after the at least one of the plurality of charge pumps has collected a predetermined amount of charge.

19. The system of claim 16, wherein the feed point of at least one of the plurality of arrays is configured to point in a plurality of directions.

20. The system of claim 19, wherein one of the plurality of directions is a direction providing the fastest charge-to-threshold for one of the plurality of charge pumps.

* * * * *